United States Patent Office 3,070,511
Patented Dec. 25, 1962

3,070,511
PROCESS FOR PREPARING 6-AMINO-PENICILLANIC ACID
Gustavo Adolfo Weitnauer, Milan, Italy, assignor to Lepetit, S.p.A., Milan, Italy
No Drawing. Filed Jan. 31, 1961, Ser. No. 85,980
Claims priority, application Great Britain Feb. 10, 1960
5 Claims. (Cl. 195—36)

This invention is concerned with the biological preparation of a metabolite of *Penicillium chrysogenum*. More particularly, this invention relates to a new process for preparing 6-aminopenicillanic acid.

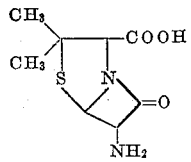

6-aminopenicillanic acid has been recently identified as a sulphur-containing metabolite of *Penicillium chrysogenum*, when this microorganism is grown in the absence of appropriate precursors of the side chain of penicillin, such as phenylacetic or phenoxyacetic acid.

The compound 6-aminopenicillanic acid is of great interest because it may be converted, through simple procedures, into penicilllins of new type which may show biological, pharmacological and therapeutical properties different from those of the previously known penicillins prepared by fermentation procedures, and which cannot be obtained by fermentation due to the fact that the Penicillium is not able to use the appropriate precursor.

As stated above, 6-aminopenicillanic acid is formed by growing *Penicillium chrysogenum* in a nutrient medium devoid of penicillin precursors. This is the only method by which the acid has previously been prepared. However, the isolation of the acid from the fermentation broths meets with considerable difficulties, owing to the fact that it cannot be extracted by organic solvents at any pH value, and that its concentration in the media is, as a rule, extremely low.

It has now been found that 6-aminopenicillanic acid can be produced in satisfactory yield by subjecting phenoxymethylpenicillin to the activity of an enzyme of the class of amidases. The term "amidases" as used herein includes all enzymes which are able to split hydrolytically the carbon-nitrogen bond of the amide group.

The natural sources of amidases are many, and, when in a sufficiently pure state, amidases may be employed without regard to the source from which they are derived. However, it is not necessary in practice to use amidases in a highly pure condition. It is well known that many internal organs of animals actually contain amidases, such as for instance hippuricase, which is able to split hippuric acid into benzoic acid and glycine. It is sufficient to prepare a homogenate of the selected interior organ in order to obtain a preparation with a good concentration of the enzyme. Although no specific restriction of animal species can be made in respect to the best source of amidase, it has been found useful in practice to employ internal organs of cattle and swine. Amidases are contained in several internal organs of these animals, such as kidneys, liver, spleen and lung.

In one method of carrying out the process of the invention, the selected internal organ, duly deprived of annexes, is cut into small pieces and extracted with a buffer phosphate solution of pH about 7.5 using a mechanical high-speed blender. The homogenate thus obtained is filtered through gauze and then centrifuged in a high-speed mechanical apparatus. The solids are collected and suspended in a phosphate buffer at pH about 7.5. To this suspension, phenoxymethylpenicillin is added and the mixture is incubated at 35–40° C. for 6–20 hours. At the end of this period the conversion of phenoxymethylpenicillin into 6-amino-penicillanic acid is about 70–80%, as revealed from the assay of phenoxymethylpenicillin and 6-aminopenicillanic acid in the homogenate.

This assay may be carried out as follows. A sample of the homogenate is centrifuged in a Multispeed apparatus at 18,000 r.p.m. for half an hour. The supernatant liquid is assayed by the hydroxylamine procedure described by Carta-De Angeli, Ventura and Dentice di Accadia in Selected Scientific Papers from the Istituto Superiore di Sanitá 2, 99 (1959), with the following provisions: (a) an analysis is carried out on the homogenate by the procedure described for the penicillin assay in fermentation media; (b) an analysis is carried out on the exhausted fluid coming from the analysis under (a) as described for the penicillin assay in salts; (c) an analysis is carried out on the homogenate as described for the penicillin assay in salts. In this manner, by the procedure of (a) the residual phenoxymethylpenicillin, not yet converted into 6-aminopenicillanic acid, is determined. The procedure of (b) gives the content of 6-aminopenicillanic acid which cannot be extracted but reacts with hydroxylamine. By the procedure of (c) the total amount which can or cannot be extracted is determined, i.e. the residual phenoxymethylpenicillin and the formed 6-aminopenicillanic acid. Thus the analysis (c) gives a result which is the sum of (a) and (b) and acts as a control of both (a) and (b).

Naturally instead of extracting the enzyme from the organs immediately before the process is carried out, a commercial acetone powder may be equally well employed, or even an extract of the same.

The advantages of the process of the invention are apparent if it is borne in mind that at the end of the process the necessary extraction of 6-aminopenicillanic acid, which may be carried out as described in the literature, is carried out on a fluid which does not contain the usual ingredients of the fermentation media for *Penicillium chrysogenum* and is free from the several metabolic products of the same microorganism. In other words, the known procedure of fermenting *Penicillium chrysogenum* in the presence of the normal precursors for penicillins gives rise to a multiplicity of products, which are admixed in the medium with the common nutrients added to the same to provide the best growing conditions for the microorganism. Thus in the latter case difficulties are experienced in the extraction as 6-aminopenicillanic acid has to be separated from substances of related structure or having similar solubility properties in organic solvents.

Example

An ox kidney, duly deprived of all annexes, such as adrenal cortex, fatty parts, big vessels of the hilum, is cut into small pieces and charged into a Waring Blendor together with phosphate buffer of pH 7.5, in a ratio of 2 volumes of buffer for each weight unity of the kidney. The mixture is homogenized, then the homogenate is filtered and centrifuged. The enzyme, being a particulate one, resides in the solids. These are separated by removing the supernatant liquid and are suspended in a volume of fresh phosphate buffer (pH 7.5) corresponding to the volume of the discarded supernatant liquid.

To the resultant suspension phenoxymethylpenicillin is added in a ratio of 5000 units per millilitre and the mixture is incubated at 37° C. The optimum conversion into 6-aminopenicillanic acid is reached after a period between 12 and 15 hours of incubation. After this time, about 75% of phenoxymethylpenicillin is transformed.

The mixture is filtered and 6-aminopenicillanic acid is extracted by known methods from the filtrate. The solids containing the enzyme may be re-used by suspending them in fresh phosphate buffer. The enzyme may be used at least 5 successive times without noticeable decrease of the enzymatic properties.

What I claim is:

1. A process for preparing 6-aminopenicillanic acid, which comprises subjecting phenoxymethylpenicillin to the activity of an amidase-containing preparation derived from a member of the group of amidase-containing organs consisting of the kidneys, livers, spleens and lungs of cattle and swine.

2. A process for preparing 6-aminopenicillanic acid, which comprises incubating, at 35–40° C. for 6 to 20 hours in a buffer phosphate solution at a pH of about 7.5, a mixture of phenoxymethylpenicillin and an amidase-containing preparation derived from a member of the group of amidase-containing organs consisting of the kidneys, livers, spleens and lungs of cattle and swine.

3. A process as claimed in claim 1, wherein a fermentation liquor containing phenoxymethylpenicillin is used as starting material.

4. A process for preparing 6-aminopenicillanic acid, which comprises subjecting phenoxymethylpenicillin to the activity of an amidase enzyme preparation derived from ox kidney.

5. A process for preparing 6-aminopenicillanic acid, which comprises incubating at 35–40° C. for 6–20 hours a mixture of an ox kidney homogenate and phenoxymethylpenicillin in a buffer phosphate solution at pH about 7.5.

References Cited in the file of this patent

UNITED STATES PATENTS

| | | |
|---|---|---|
| 2,941,995 | Doyle et al. | June 21, 1960 |
| 3,014,846 | Rolinson et al. | Dec. 26, 1961 |